(12) United States Patent
Anderson

(10) Patent No.: US 7,753,007 B1
(45) Date of Patent: Jul. 13, 2010

(54) EAR-A-ROUND EQUIPMENT PLATFORM FOR ANIMALS

(75) Inventor: Dean M. Anderson, Las Cruces, NM (US)

(73) Assignee: The United States of America as represented by the Secretary of Agriculture, Washington, DC (US)

(*) Notice: Subject to any disclaimer, the term of this patent is extended or adjusted under 35 U.S.C. 154(b) by 744 days.

(21) Appl. No.: 11/639,537

(22) Filed: Dec. 15, 2006

Related U.S. Application Data

(60) Provisional application No. 60/754,409, filed on Dec. 28, 2005.

(51) Int. Cl.
*A01K 15/02* (2006.01)

(52) U.S. Cl. ..................... 119/721; 119/837

(58) Field of Classification Search ................ 119/721, 119/837, 851; 2/425
See application file for complete search history.

(56) References Cited

U.S. PATENT DOCUMENTS

| | | | | |
|---|---|---|---|---|
| 2,704,066 | A | * | 3/1955 | Sanden .................. 606/204.45 |
| 3,315,668 | A | * | 4/1967 | Kellner .................. 606/204.55 |
| 3,587,571 | A | * | 6/1971 | Daniels .................. 606/204.55 |
| 3,942,306 | A | * | 3/1976 | Kulka .......................... 54/80.2 |
| 4,233,942 | A | * | 11/1980 | Williams ..................... 119/814 |
| 5,099,797 | A | | 3/1992 | Gonda |
| 5,121,711 | A | | 6/1992 | Aine |
| 5,207,178 | A | | 5/1993 | McDade et al. |
| 5,241,923 | A | | 9/1993 | Janning |
| 5,353,744 | A | | 10/1994 | Custer |
| 5,408,956 | A | | 4/1995 | Quigley |
| 5,533,470 | A | | 7/1996 | Rose |
| 5,608,381 | A | | 3/1997 | McCarney et al. |
| 5,636,597 | A | | 6/1997 | Van Curen et al. |
| 5,640,932 | A | | 6/1997 | Bianco et al. |
| 5,857,433 | A | | 1/1999 | Files |
| 5,868,100 | A | | 2/1999 | Marsh |
| 5,949,350 | A | | 9/1999 | Girard et al. |
| 5,967,094 | A | | 10/1999 | Grimsley et al. |
| 6,232,880 | B1 | | 5/2001 | Anderson |
| 6,289,522 | B1 | * | 9/2001 | Jones et al. ..................... 2/425 |
| 6,557,186 | B1 | * | 5/2003 | Purnell ........................... 2/425 |
| 2007/0062462 | A1 | * | 3/2007 | McGuire .................... 119/850 |

* cited by examiner

*Primary Examiner*—Yvonne R. Abbott
(74) *Attorney, Agent, or Firm*—John Fado; Randall E. Deck; Lesley Shaw

(57) ABSTRACT

One or more mechanical, electrical or chemical application devices, chemical agents, and/or identification information may be carried by an apparatus worn on the heads of animals. The apparatus comprises a first 3-dimensional loop-shaped member having first and second opposed inner and outer surfaces, a third outer surface extending between the first and second surfaces, and an interior opening extending therethrough from the first surface to the second surface. The loop-shaped member is of a size sufficient to fit over one ear or horn of the animal with the animal's ear or horn protruding through the opening, the first inner surface facing the head of the animal, and the second outer surface facing away from the head of the animal. The loop-shaped members may be worn by a subject animal individually or in pairs, with one member over each ear or horn, in accordance with the desired application, and a variety of mechanical, electrical or chemical application devices, chemical agents, and/or identification information may be incorporated into or onto the member, or attached thereto, either directly or indirectly.

45 Claims, 5 Drawing Sheets

EAR-A-ROUND EQUIPMENT PLATFORM FOR ANIMALS

CROSS-REFERENCE TO RELATED APPLICATION

This application claims the benefit under 35 U.S.C. 1.19(e) of U.S. provisional No. 60/754,409, filed Dec. 28, 2005, the contents of which are incorporated by reference herein.

BACKGROUND OF THE INVENTION

1. Field of the Invention

The invention relates to a method and apparatus for carrying mechanical, electrical, and/or chemical application devices, and/or identification information on the heads of animals.

2. Description of the Prior Art

Livestock such as cattle, and some wildlife, particularly ruminants such as elk and deer, as well as other animals including pigs, horses, burros and other monogastrics, are currently controlled within defined inclusion zones (pastures/paddocks) by ground-based fencing. Wire is the most common modern conventional fencing material for controlling animals on large areas. Wire fencing requires attachment to a ground-based support, most commonly a wood, metal, concrete, plastic or synthetic polymer post. Insulators may be required between the wire and the post if electrical charge is to be carried in the wires.

The need for wire material and its subsequent support make wire fence expensive on a per lineal distance basis as a method of controlling free-ranging animals. Add to the cost of materials, the labor required to install the fence and additional labor required to maintain these structures and substantial economic costs are incurred using this method of animal control. In addition, ground-based fences have critical disadvantages above those associated with direct costs. Most ground-based fencing systems are not easily moved on a frequent basis and as such their static position on the landscape thwarts flexible management, especially those strategies focused on promoting proper utilization of the vegetation resource. Neither the vegetation resource nor the herbivory among ecosystems is static in time or space. Therefore, it logically follows that control of foraging animals on these ecosystems should likewise not be static. Fragile ecosystems, such as riparian areas, are not served well by conventional fencing systems that inhibit flexible management. These ecosystems require the flexible spatial and temporal control of animals which conventional fencing systems cannot provide on a cost affective basis. Furthermore, conventional wire fencing is considered by many to have undesirable aesthetic implications in addition to disrupting the movement of many wildlife species.

In the recent past, electronic-based containment systems have been described for several animal species, particularly pets and specifically canines. However, electronic devices for controlling livestock have also been described (Quigley, U.S. Pat. No. 5,408,956; Marsh, U.S. Pat. No. 5,868,100; Anderson and Hale, U.S. Pat. No. 6,232,880). All previously described electronic systems except for the methodology described by Anderson and Hale for controlling animal location require ground-based equipment in addition to devices attached to an animal. The ground-based transmitters are located at remote and fixed locations but always within range of the most-distant transponder in the system (Janning, U.S. Pat. No. 5,241,923). The transmitter emits a signal which is picked up by a receiver worn by the animal. Most systems relay on Radio Frequency (RF) signals generated from ground-based transmitters; however, some systems utilize near infrared (McCarney et al., U.S. Pat. No. 5,608,381) or compressional wave beams (Bianco, U.S. Pat. No. 5,640,932). Frequently the receiver is attached to a collar (Gonda, U.S. Pat. No. 5,099,797) that is worn around the animal's neck. The aversive stimuli are either under manual or automatic ground-based control.

Depending on the skill of the human handler in interpreting and initiating stimulation, desirable changes in the behavior of the animal vary. The sequence of stimuli used to alter behavior in prior art occur in various combinations to condition the animal to give a reasonably predictable response to enhance the animal's safety and/or usefulness to the owner.

Only recently have RF signals emanating from satellites been incorporated into animal control devices but only to provide accurate information on animal location. The current uses of the Global Positioning System (GPS), especially in biology, appear to be focused on determining the location of animals or in Precision Agriculture on the agronomic application or removal of materials from fields. Using GPS as a technology to train animals has only been referenced by Files (Files, U.S. Pat. No. 5,857,433).

Sound and electric shock transducers apply the predominant forms of motivational stimuli. Acoustic audio stimuli include beeps (Custer, U.S. Pat. No. 5,465,687), whistles (Fury, U.S. Pat. No. 3,980,051) or a combination of sounds (Gonda et al., U.S. Pat. No. 4,335,682) including the human voice (Yarnall, Sr. et al., U.S. Pat. No. 4,745,882; Yarnall, Jr. et al., U.S. Pat. No. 5,565,850; Kim et al., U.S. Pat. No. 5,605,116) used in conjunction with electrical shock in various patterned combinations (Gonda et al., U.S. Pat. No. 4,802,482), sequences and durations.

Electric shock is normally administered from a single pair of electrodes. An attempt has been described for reducing the occurrence of spurious signals that could induce aversive stimuli to an animal when it was not requested by the handler (Touchton et al., U.S. Pat. No. 5,576,694). McDade et al. (U.S. Pat. No. 5,207,178) describes a shock collar that contains one fixed pair of electrodes and two individual electrodes that can be moved to different positions on the collar.

These prior art systems utilized acoustic stimuli in combination with electric shock without regard to applying them to a specific location and side of the animal, or from a specific platform, in order to change the animal's direction of movement. Furthermore, motivational stimuli in the art were not easily changed once established (Touchton et al., U.S. Pat. No. 5,435,271) and at best appeared limited to only a few preset levels (Gonda et al., U.S. Pat. No. 4,802,482). For example, in one device the level of electric shock stimulation could only be varied by interchanging electrode structures having various resistances (Gonda et al., U.S. Pat. No. 5,471,954). This limitation in prior art made it difficult if not impossible to change stimuli patterns in real-time based upon immediate management needs and conditions.

More recently, Anderson and Hale (U.S. Pat. No. 6,232,880) developed an improved animal control system that was attached to a free-ranging animal that is capable of changing the animal's location and direction of movement through one or a series of cues (aversive stimuli) administered bilaterally to either the right or left side of the animal's body and/or head. Control of an animal's direction of movement with this invention utilized the animal's instinctive tendency to move away from an uncomfortable or stress-inducing stimulus, and/or the ability of a subject animal to be trained or conditioned to move in a specific, predetermined direction in response to application of a stimulus on one selected side thereof. The cues are only administered when the animal attempts to leave a zone of inclusion and enter a zone of exclusion by penetrating a boundary separating the two zones.

The device of Anderson and Hale integrates a satellite positioning system such as the GPS with electro-mechanically bilaterally applied aversive stimuli such as acoustic sound, vibration, and/or electric shock. Sequential positions of a subject animal are monitored with the satellite positioning system, and these data are then used to determine the location of the animal and its direction of movement relative to the closest Virtual Center Line (VCL) that is the center of a Virtual Boundary (VB) in addition to the angle of incidence between the animal's direction of movement and the nearest VCL. When an animal attempts to leave a zone of inclusion defined by the VB, the device will cue the animal to change both its direction of movement and location based upon a repertoire of bilaterally applied aversive stimuli. Upon contacting or penetrating a VB, an aversive stimulus, or more preferably a cascade of aversive stimuli, will be applied autonomously to either the right or left side (bilateral stimulation) of the animal thereby inciting it to move in a direction away from the VCL and back into the zone of inclusion. The mechanical and electronic hardware of the Anderson and Hale device can be mounted on the animal using a variety of supports, including neck saddles or ear tags, as well as implants, collars, shoulder harnesses, saddles, or leg bands.

However, despite these and other advances, the need exists for an improved external and robust, functional platform for housing virtual fencing devices, especially the Directional Virtual Fencing (DVF) hardware and software of the Anderson and Hale system for monitoring and controlling animal movement.

SUMMARY OF THE INVENTION

We have now developed a novel method and apparatus for carrying one or more mechanical, electrical or chemical application devices, chemical agents, and/or identification information on the head or head and neck of animals. The apparatus comprises a first 3-dimensional loop-shaped member having first and second opposed inner and outer surfaces, a third outer surface extending between the first and second surfaces, and an interior opening extending therethrough from the first surface to the second surface. The loop-shaped member is of a size sufficient to fit over one ear or horn of the animal with the animal's ear or horn protruding through the opening, the first inner surface facing (adjacent to) the head of the animal, and the second outer surface facing away from the head of the animal.

The loop-shaped members may be worn by a subject animal individually or in pairs, with one member over each ear or horn, in accordance with the desired application, and a variety of mechanical, electrical or chemical application devices, chemical agents, and/or identification information may be incorporated into or onto the member, or attached thereto, either directly or indirectly.

In accordance with this discovery, it is an object of this invention to provide an apparatus worn by an animal which may be used as a platform for supporting or carrying mechanical, electrical, and/or chemical devices, chemical agents, or identification information which has reduced susceptibility to being caught on foreign objects, and will not result in injury to the animal if it is caught on a foreign object.

It is also an object of this invention to provide an apparatus worn by an animal which may be used as a platform for supporting or carrying mechanical and/or electrical devices for monitoring or controlling the movement or location of an animal through electronic signals sent and or received by appropriate hardware and software in or on the apparatus.

Another object of this invention is to provide an apparatus worn by an animal which may be used as a platform for supporting or carrying chemical application devices for applying chemical agents, including pesticides, to the animal.

Still another object of this invention is to provide an apparatus worn by an animal which may be used as a platform for carrying identification information about the animal wearing the apparatus.

Other objects and advantages of this invention will become readily apparent from the ensuing description.

DETAILED DESCRIPTION OF THE INVENTION

Figure 1:
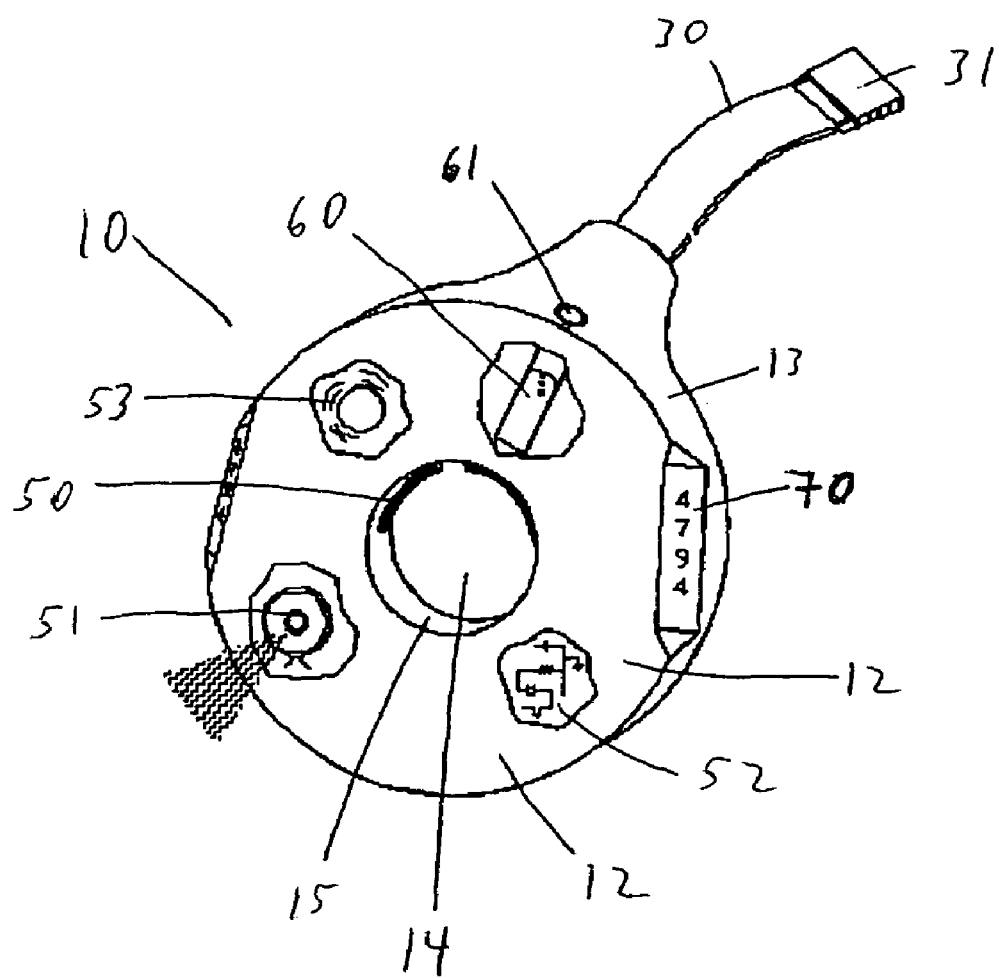
FIG. 1 shows a perspective view from the outside top of the single first loop-shaped member (10) of the Ear-A-Round apparatus (referred to hereinbelow as the EAR apparatus) with electrode surfaces (50) for applying electric stimulation and animal identification indicia code (70), and with cutaways to show imbedded sound generators (51), signal receiver/transmitter (52), pesticide applicator (60) and vibration generator (53).

The apparatus of this invention was designed for carrying any desired mechanical, electrical, chemical application devices, as well as chemical agents or identification information on the head of an animal. Without being limited thereto, the apparatus is particularly suited for use in conjunction with the animal control system developed by Anderson and Hale (U.S. Pat. No. 6,232,880, the contents of which are incorporated by reference herein). In this embodiment, the apparatus may be used to carry a satellite positioning receiver and a stimulus unit for selectively applying bilateral aversive stimuli to either the right or left side of the animal. Alternatively, the apparatus may be used to carry any conventional aversive stimulus unit for controlling or influencing the movement or position of an animal, or transmitters for relaying detectable signals to allow the determination of the position and/or direction of movement of an animal, or indicia or identification information for distinguishing among animals.

The apparatus may also be used to apply one or more veterinary or pesticidal agents to the animal, either by carrying a chemical agent dispenser for the agents or by carrying the agents directly on or in the apparatus. The apparatus may be used for practicing any of the above-mentioned applications on a variety of animals. However, the invention is preferably used with non-human, wild or domesticated animals, ranging from pets to large domestic or wild animals, including large game mammals, primates or non-primates, and other mammals, particularly range or farm animals. Specific animals on which the apparatus and systems may be used include, but are not limited to, primates, perissodactyla, and artiodactyla, preferably bovine, caprine, equine, ovine, and porcine, and most preferably cattle, goats, horses, sheep, and pigs.

While the system of Anderson and Hale has worked well for controlling the movement of animals, challenges have been encountered with the mounting of the apparatus on the animal. As with numerous other devices which are typically mounted externally on the animal, the various supports, whether they be neck saddles, ear tags, collars, shoulder harnesses, saddles or leg bands, are all susceptible to becoming caught on objects such as brush and conventional fencing, resulting in the potential for loss of the device. Moreover, in the case of ear tags, when the tags are caught on a foreign object the tags may be ripped out of the animal's ear, and the resultant wound may become infected or infested with various insect pests. Therefore, the need exists for an improved device for mounting animal control, monitoring, treatment or identification tools onto the subject animals, which has reduced susceptibility to being caught on foreign objects, and which will not result in injury to the animal in the unlikely event that it is removed.

Referring to the figures, the Ear-A-Round apparatus (referred to hereinbelow as the EAR apparatus) of this invention includes a first 3-dimensional loop-shaped member (10) which comprises a first inner surface (11), a second, opposed outer surface (12), a third outer surface (13) extending between said first and second surfaces, and an opening (14) having an inner edge (15) which extends through the member from the first surface to the second surface.

Loop-shaped members (10) may be used singly on an animal or in pairs, one about each ear or horn, depending upon the desired application. Generally, use of pairs is only required for applications requiring the selective application of bilateral aversive stimuli to either the right or left side of the animal, such as with the animal DVF control system of Anderson and Hale (ibid). However, pairs of members (10) may also be used where it is desired to employ a plurality of electrical, mechanical, and/or chemical application devices, and thereby reduce the weight borne on any one side of the animal.

Fixation of the member (10) to the head of the subject animal may be effected, in a first preferred embodiment, using a variety of commercially available biologically suitable adhesives or glues applied between the head and first inner surface (11). The particular glue or adhesive is not critical, but should be effective for adhering the first inner surface (11) directly to the animal's head through any anticipated adverse environmental conditions such as cold, heat, wet, and dry. In an alternate preferred embodiment, shown in FIG. 3, member (10) may be removably attached to the animal's head using a second or intermediate loop-shaped member (20). In this embodiment, second member (20) comprises first and second opposed outer surfaces (21) and (22), respectively, and an opening (24) extending therethrough from the first surface (21) to the second surface (22). The first surface (21) of the second member (20) is positioned adjacent to the head of the animal and is adapted to be directly affixed thereto with a biologically suitable glue or adhesive, while the second surface (22) of member (20) is adjacent (contiguous) to and removably attached to the first inner surface (11) of the first loop-shaped member (10), and the opening (24) of the second member (20) is substantially aligned with the opening (14) of the first member (10). First and second members (10) and (20) may be releasably attached using a variety of techniques, including clasps or buckles, straps, tape, or adhesives or glues, although if an adhesive or glue is used it should be weaker than any adhesives or glues used to attach the first surface (21) of second member (20) to the animal's head. However, the first and second members are preferably attached by providing cooperating, opposing hook and loop type fasteners such as VELCRO strips, with one of the hook or loop being positioned on the second surface (22) of the second member (20), and the other of the hook or loop being positioned on the first surface (11) of the first member (10).

Figure 2:
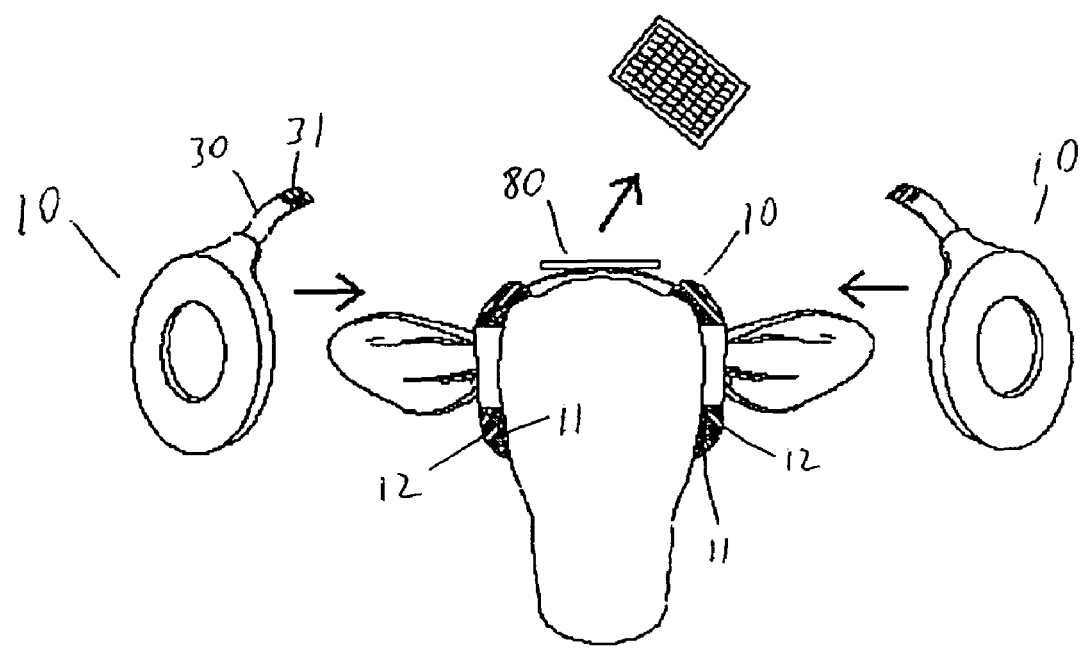
FIG. 2 shows a front view of an animal's head with the EAR apparatus employed as a pair of first loop-shaped members (10) placed one about each ear of an animal and affixed to the animal's head with adhesive. A bridge connecting the right and left portion of the pair is also shown.
Figure 3:
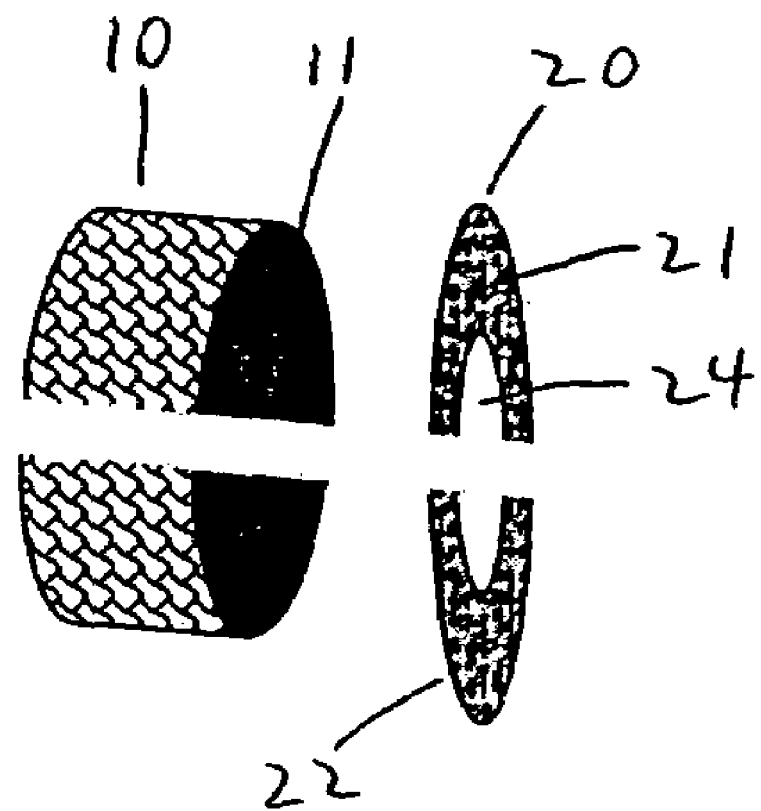
FIG. 3 shows a perspective view of an embodiment wherein member (10) is removably attached to the animal's head using a second or intermediate ring-shaped member (20). Second member (20) is positioned adjacent to the head of the animal and is adapted to be directly affixed thereto with a glue or adhesive. The first and second members (10) and (20) are releasably attached using cooperating opposing hook and loop type fasteners such as VELCRO.
Figure 4:
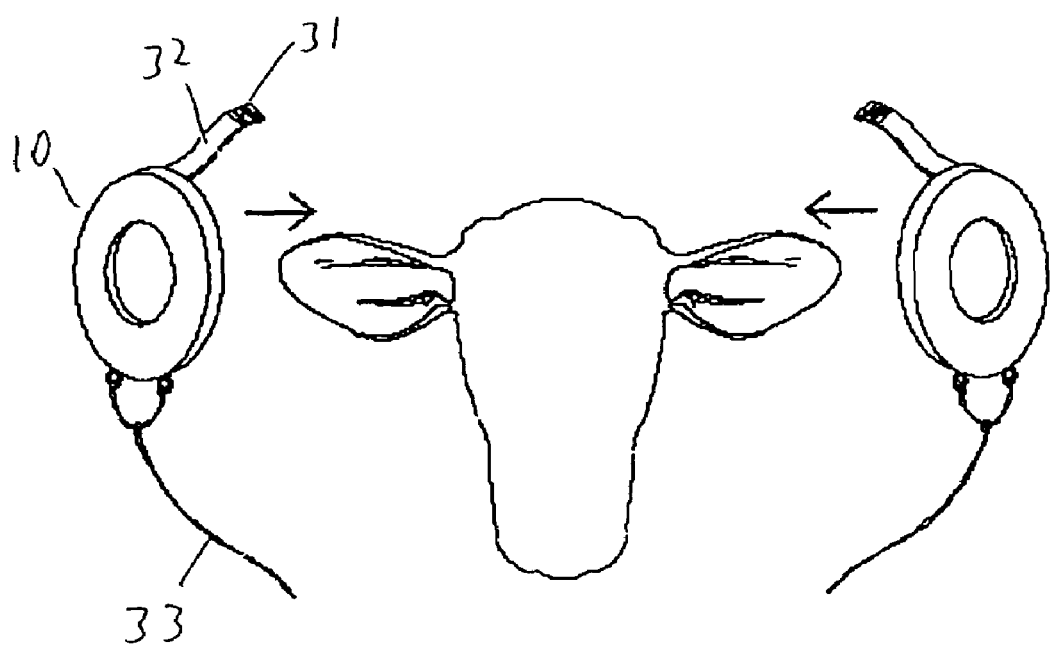
FIG. 4 shows a front view of an animal's head with the EAR apparatus employed as a pair of first loop-shaped members (10) placed one about each ear of an animal and retained on the animal's head by use of a first strap (32) attached to and extending between the loop-shaped members across the top of the head or neck of the animal, and a second strap (33) extending between the loop-shaped members under the head or neck of the animal.

In a second preferred alternate embodiment which is not limited, but is particularly suited, to applications employing a pair of first members (10), one about each ear or horn, the first members may be retained on the animal's head using one or more optional straps (30). These straps may be used alone or in combination with other attachment mechanisms described herein. For applications employing only a single member (10) on the animal, the strap (30) will preferably circumscribe the animal's head and/or neck, while applications employing a pair of first members (10), one about each ear, the strap may extend between the members (10) as shown in FIGS. 2 and 3. Strap (30) may also include a releasable buckle (31) or other releasable closure such as cooperating, opposed hook and loop closures (such as VELCRO), latches, snaps, buttons, tape, adhesive or glue, to facilitate application and removal of the first member(s) (10) on the animal. This embodiment provides the added advantage that any or all of the electrical, mechanical or chemical application devices, power source, chemical agents, or identification information may be attached to or provided in a container on the straps, as illustrated in FIG. 2. FIG. 4 shows a variation of this embodiment wherein a pair of first members (10) are retained on the animal's head by use of a first strap (32) attached to and extending between the loop-shaped members (10) across the top of the head or neck of the animal, and a second strap (33) extending between the loop-shaped members (10) under the head or neck of said animal. The material of construction of the straps is not critical, but the straps are preferably constructed from a flexible or rigid or elastic material, and either rounded in cross-section or padded to avoid abrasion against the animal's skin.

In another alternative embodiment, for subject animals having ear pinna, horns or antlers which are much larger at their outer extremity than at their base adjacent to the head, it is envisioned that the first member may be retained on the animal's head without the need for adhesives or glue contacting the animal. In this embodiment, to ease the placement about the ear the first member (10) may be either constructed from two separate pieces (e.g., separated along a diametric line through the first member) which can be securely joined together or from a single piece which may be opened, which piece(s) are placed about the base of the ear pinna the pieces joined together or the opening securely closed. The member (10) may then be held in place by the ear pinna, horn or antler itself.

Figure 5:
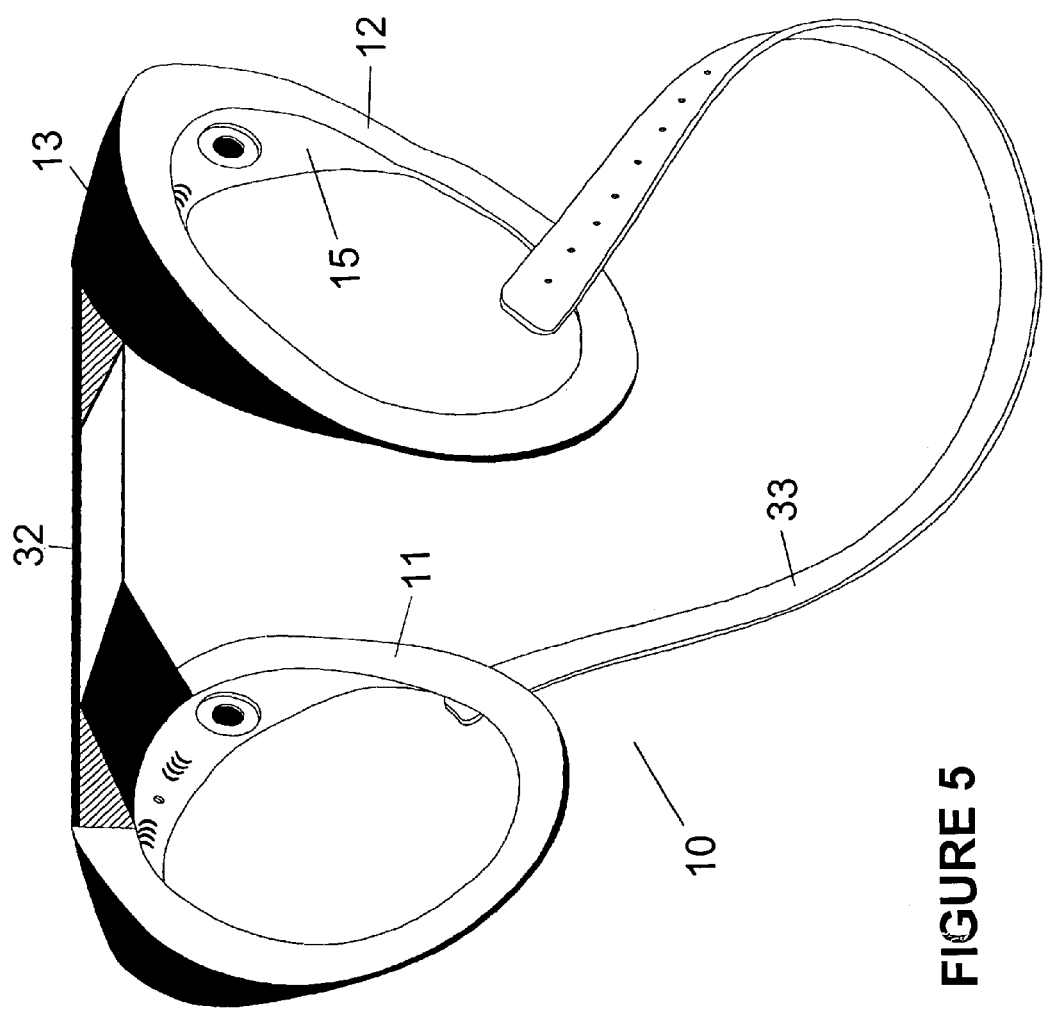
FIG. 5 shows an alternate, preferred embodiment of the invention wherein the first, second, and third surfaces (11), (12), and (13) are constructed from individual components.

The material of construction of the first loop-shaped member (10) and the optional second loop-shaped member (20) is not critical. Suitable materials include, but are not limited to, natural or synthetic polymeric materials such as rubbers, plastics, and open or closed cell foams; as well as metals. Second member (20) may also be formed from synthetic or natural fabrics or materials such as felt or cloth. If the members are formed from a rigid material, at least the surface in contact with the animal's head should be padded to avoid abrasion. By way of example and without being limited thereto, pads may be constructed as foam wedges as shown in FIG. 5. However, in the preferred embodiment, the first and/or second members are formed from polymers which are suitable for molding, and particularly polymers which are flexible or compliant so as to conform to the shape of the subject animal's head when in use. In this embodiment, at least the surface in direct contact with the animal's head, particularly the first surface (11) of member (10) or the first surface (21) of second member (20) or both, may be molded in the approximate shape of the animal's head in the vicinity of the ear to maximize the surface area contact with the head. The first member (10) may also be provided with a hollow interior compartment or cavity to accommodate any electrical, mechanical or chemical application devices therein. To prevent any possibility of harm to the animal if the apparatus was to become caught on a foreign object, member (10) or straps (30) may include a weakened or break-away region.

The size of first member (10) and opening (14) are not critical and will vary with the particular target animal species, provided that they are a sufficient size to fit over an ear or horn, where appropriate, of the animal with the ear or horn protruding through the opening, the first inner surface (11) facing (adjacent to) the animal's head, and second surface (12) facing away from the animal's head. Of course it is also understood that the size of the member (10), particularly the depth between the first and second surfaces (11) and (12) and between the third outer surface (13) and the inner edge (15) of opening (14), may also be increased to accommodate any optional electrical, mechanical, or chemical application devices incorporated or embedded therein. The overall shape of loop-shaped member (10) and its accompanying first, second, and third surfaces and opening is not critical and may be symmetric, asymmetric or irregular, and the loop may be open, but is preferably closed. Without being limited thereto, suitable shapes include approximately ring-shaped structures, including approximately annular, toroidal, ovoidal, elliptical, or polygonal configurations, as well as totally irregular forms. Moreover, although polygonal shapes may be used, it is preferable to construct the device with smooth and/or rounded edges and to avoid sharp edges which might contact the animal or foreign objects, including along the periphery of the third outer surface (13), at the edges between the first or second surfaces (11) and (12) and inner edge (15) of opening (14), or between the first or second surfaces (11) and (12) and third surface (13). As disclosed above, to maximize the surface area contact between the member (10) and the animal's head, first inner surface (11) is preferably adapted to generally conform to the shape of the subject animal's skull when the member (10) is placed over the ear and in contact with the animal's head.

The components of the loop-shaped first member 10, including the first inner surface (11), the second outer surface (12), and the third outer surface (13) may be constructed as a single, integral unit, or one or more of the components may be fabricated separately from the same or different materials, which may be subsequently joined together. In an alternate, preferred embodiment shown in FIG. 5, the first, second, and third surfaces (11), (12), and (13) may be fabricated as distinct components or loops, wherein the third surface forms a spacer or interior compartment positioned between the first and second surfaces. In a particularly preferred embodiment, the depth of the third outer surface (13) decreases (i.e., has a wedge or triangular cross-section from top to bottom) and thus the first and second surfaces are not parallel but converge toward one end. The above-mentioned electrical, mechanical or chemical application devices may be also accommodated within or on this third surface. In this embodiment, the first member (10) is typically positioned on the head of the animal with the wider end, that is the end wherein the first and second surfaces are spaced further apart, disposed higher and near the top of the animal's ear or horn, and the end wherein the first and second surfaces are proximal to one another is disposed lower and near the bottom of the animal's ear or horn.

The EAR apparatus of this invention may be used in a wide variety of applications, including virtually any process wherein a device, chemical agent, or indicia are to be carried on an animal. In accordance with a first preferred embodiment, the apparatus is used for controlling or influencing the movement of an animal. In this embodiment, the apparatus may comprise any conventional aversive stimulus unit or units, including but not limited to electric shock generators such as electrodes or electrode surfaces (50), acoustic generators (51) such as piezo transducers, amplifiers or speakers, vibrators or oscillators (53), pricking devices, and pinching devices, or any known device to stimulate any of the senses even including magnetics. Other suitable aversive stimuli units include light generators effective for directing a light into the animal's eye(s) such as a light source coupled to an optic fiber terminating near the animal's eye. A signal receiver and/or transmitter (52) is also provided in communication with and effective for activation of the stimulus unit. This receiver and/or transmitter is preferably included in the apparatus of this invention, although it may be located elsewhere on the animal. Actuation of the aversive stimuli may be initiated when the receiver detects a signal emitted from an automatically or manually operated transmitter as is conventional in the art. In this embodiment the apparatus may be used in conjunction with known animal control systems, carrying stimulus generators, receivers, and/or other animal-borne components, such as but not limited to those described by Marsh (U.S. Pat. No. 5,868,100), Quigley (U.S. Pat. No. 5,408,956), Grimsley et al. (U.S. Pat. No. 5,682,839), Girard et al. (U.S. Pat. No. 5,949,350), Custer (U.S. Pat. No. 5,353,744), Aine (U.S. Pat. No. 5,121,711), McDade et al. (U.S. Pat. No. 5,207,178), Van Curen et al. (U.S. Pat. No. 5,636,597), Files (U.S. Pat. No. 5,857,433), Rose (U.S. Pat. No. 5,533,470), Janning (U.S. Pat. No. 5,241,923), McCarney et al. (U.S. Pat. No. 5,608,381), Bianco (U.S. Pat. No. 5,640,932), Gonda (U.S. Pat. No. 5,099,797), or Fay et al. (1989, Applied Animal Behavior Science, 23:165-171), the contents of each of which are incorporated by reference herein.

Although a variety of aversive stimulus units may be employed, and these units may be provided in or on any part of the device, including the first member (10), second member (20), or any strap attached to the first member (10), in a preferred embodiment, the units are embedded within or carried upon the first member (10). Moreover, the aversive stimulus unit also preferably includes at least an electric shock generator effective for administering an electric stimulation to the animal. In a particularly preferred embodiment, the electric shock generator includes a pair of at least partially exposed electrodes adapted to contact the animal's head, neck, ear or combinations thereof. For instance, as shown in FIG. 1, exposed electrodes (50) are adjacent to either or both of the first surface (11) and the inner edge (15) of first member (10) where they are in contact with the head and/or ear of the animal when the member is in place. The exposed electrodes may by approximately flush with first surface (11) or inner edge (15), or may protrude therefrom, and may optionally be spring loaded.

In another particularly preferred embodiment, the EAR apparatus is used in conjunction with the animal control system disclosed by Anderson and Hale (U.S. Pat. No. 6,232,880), carrying one or more or all of the stimulus unit(s), satellite positioning receiver, microprocessor based computer control unit, power source, and RF transponder described in the patent. One of the first and second independently operable stimuli generators of Anderson and Hale may be attached to the apparatus so as to apply stimulus to one side of the animal, while the other of the stimuli generators is attached so to apply stimulus to the other side of the animal. The microprocessor is in communication with the bilateral stimulus unit and the satellite positioning receiver, and is effective for receiving data indicative of the position of the animal from the satellite positioning system receiver, and selectively controlling the activation of the first or second stimuli generators. In this capacity, the microprocessor is also effective for determining movement and direction of the animal, comparing the position of the animal with the position of at least one predetermined VCL to determine the closest VB and the distance of the animal therefrom, determining which side of the animal is nearest to the VCL, and selectively activating one of the first or second stimuli generators in response to the determination of the distance from the closest boundary line and the determination of which side of the animal is nearest to the closest boundary line.

As an alternative to use of a satellite positioning receiver such as described in the Anderson and Hale patent, the animal's position and direction of movement may be determined by substitution of a conventional telemetry system for transmitting or receiving data, such as by use of RF triangulation. In this embodiment, the microprocessor would receive data indicative of the position of the animal from the telemetry receiver rather than satellite positioning system receiver. An optional electronic compass such as a magnetometer may also be included to provide additional data for determining direction of movement. In accordance with another variation, an optional transmitter may also be provided for transmitting data, such as location information, from the animal to a remote location. The receiver and transmitter may be separate or combined units as is known in the art.

Any or all of the stimulus units, receiver, transmitter, microprocessor, power source, and RF receiver of Anderson and Hale, or the telemetry receiving or transmitting system or magnetometer as described above, may be provided in or on any part of the device, including the first member (10), second member (20), or any strap attached to the first member (10). However, in a preferred embodiment, at least the first and second stimuli generators are embedded within or carried upon the first member (10) as described above for the conventional animal control applications.

For applications wherein the primary objective is animal monitoring rather than immediate control of position, the EAR apparatus may be used to carry a transmitter for relaying a detectable signal to a receiver at a remote location, which signal is effective for determining the position and/or direction of movement of the animal. A variety of transmitters are known in the art for monitoring and/or tracking animals, any one of which is suitable for use herein. For example, without being limited thereto, radio frequency or radio wave signal transmitters are preferred.

In yet another embodiment, the EAR apparatus of the invention may be used for application of chemical agents to the animal. While a variety of agents may be applied using the apparatus, including virtually any topical veterinary or therapeutic agent, the application of pesticides, particularly insecticides and miticides effective for the control of insects and ticks on the animals, is preferred. Moreover, the apparatus may be used as a liquid delivery system or as a dry or solid delivery system.

FIG. 1 shows an example of a preferred delivery system for liquid formulations of chemical agents. In this example, the applicator comprises a pesticide reservoir (60) embedded within first loop-shaped member (10), and communicating with the third outer surface (15) through a conduit (61). Liquid from reservoir (60) may flow through and exit conduit (61) to flow or trickle directly upon the head or neck of the animal. Pesticide flow from the reservoir (60) may be controlled by use of an optional valve, including a conventional time controlled valve, but flow is preferably regulated by providing an absorbent material within, conduit (61) in communication with the reservoir to wick the liquid from the reservoir through the conduit to the exterior surface of member (10), whereupon it may contact the hide, fur, or hair of the subject animal. Absorbent material may also be optionally provided on the exterior of the member which is adjacent to or near conduit (61) and also in contact with the animal, thereby functioning as a wick to enhance the flow of liquid from channel (61) into contact the animal.

The apparatus is not limited to the particular wet delivery system shown, as a variety of other wet systems may also be employed. For example, the first member(s) (10) or straps may be impregnated or coated with a formulation of the chemical agent. In accordance with another alternative embodiment, an absorbent material saturated with the composition of the chemical agent may be attached onto the first loop-shaped member (10) or straps, with no additional pesticide supply mechanism. In this embodiment, the user would need only to saturate the absorbent material with fresh liquid at regular intervals.

As mentioned, dry chemical agent delivery systems may also be used. In accordance with one such preferred embodiment, plastic strips impregnated with the chemical agent may be attached, hung or wrapped around the first member(s) (10) or straps. For pesticide application, suitable applicators for use herein include but are not limited to Taktic strips (Hoechst Raussel Agri Vet Co., Sommerville, N.J., USA) impregnated with amitraz. Alternatively, dry formulations may be coated directly onto the surface of the first member(s) (10) and/or straps.

Use of the EAR apparatus for identification of animals may be effected by providing suitable indicia (70) on the outer surface of the first member(s) (10) or straps. In a preferred embodiment, the indicia include conventional bar codes to facilitate electronic identification. Alternatively or in addition, electronic identification information may also be provided such as by a transmitter relaying animal identification information, or using conventional programmable "computer chips" embedded with animal identification information which may be retrieved by use of an electronic scanner, such as the AVID microchip (AVID Microchip I.D. Systems, Folsom, La., USA).

Power to operate the various electrical, mechanical and chemical application devices may be provided by a power source (80) which may also be embedded within or attached to first member(s) (10) or straps. A variety of power sources are suitable for use herein, although typically, power will be supplied using onboard batteries or capacitors. In one preferred embodiment, the power supply will include a solar cell or panels to trickle charge the batteries, thus reducing the number of times animals wearing the device must be restrained to service batteries. External power jacks may also be added to facilitate recharging of the batteries. A variety of commercially available batteries are suitable for use herein, including but not limited to nickel cadmium and nickel metal hydride batteries, lithium ion batteries, and all-polymer batteries also known as an Integrated Power Source (IPS) with plastic characteristics that employ light weight solid substance electrolytes, not fluids, capable of accepting multiple charging and discharging cycles. The solid substance polymer batteries lend themselves to be custom conformed, fit, or tailored to many applications. It is envisioned that these polymer batteries may allow the housing, battery and charge management system to be constructed as a wholly integrated assembly, with the batteries also serving as a housing for the electronics.

In an alternate preferred embodiment, the power source may also include a conventional kinetic energy to power converter for charging the battery or capacitor. In this embodiment, the movement of the animal, and particularly the head, ears, leg, skin or tail, is exploited to power the various components. A variety of known kinetic energy to power converters are suitable for use herein. For example, without being limited thereto, the converter may include a magnet movable through a wire coil. As the animal moves, the magnet repeatedly passes back-and-forth through the coil, generating an electric current used to charge the battery or capacitor.

It is understood that the foregoing detailed description is given merely by way of illustration and that modifications and variations may be made therein without departing from the spirit and scope of the invention.

I claim:

1. An apparatus to be worn on the head or head and neck of an animal comprising at least one first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising an aversive stimulus unit effective for administering at least an electric shock to said animal, which said aversive stimulus unit is incorporated into or onto said member or attached thereto.

2. The apparatus of claim 1 wherein said aversive stimulus unit comprises a pair of at least partially exposed electrode surfaces adapted to contact said animal's head, neck, ear or combinations thereof.

3. The apparatus of claim 2 wherein said partially exposed electrodes are adjacent to said first surface or said opening or both.

4. The apparatus of claim 1 further comprising a signal receiver in communication with said aversive stimulus unit, which said signal receiver is incorporated into or onto said member or attached thereto.

5. The apparatus of claim 1 further comprising a pair of said first loop-shaped members, said members adapted to fit over opposite ears or horns of said animal and be worn on the head of said animal, and wherein said aversive stimulus unit comprises a bilateral stimulus unit comprising first and second independently operable aversive stimuli generators effective for selectively administering at least an electric shock onto one side of an animal.

6. The apparatus of claim 5 wherein said first aversive stimuli generator is attached to or embedded within one of said pair of first members, and said second aversive stimuli generator is attached to or embedded within the other of said pair of said first members.

7. The apparatus of claim 6 wherein each of said first and said second aversive stimuli generators comprise at least partially exposed electrodes adapted to contact said animal's skin in the region of the head, neck, ear or combinations thereof.

8. The apparatus of claim 7 wherein said partially exposed electrodes are adjacent to said first inner surface, said opening, or both.

9. The apparatus of claim 1 further comprising a pair of said first loop-shaped members, said members adapted to fit over opposite ears or horns of said animal and be worn on the head of said animal, and at least one strap connecting said first loop-shaped members which said strap is effective for retaining said first loop-shaped members on the head of said animal.

10. The apparatus of claim 9 wherein said at least one strap comprises a first strap extending between said first loop-shaped members across the top of the head or neck of said animal, and a second strap extending between said first loop-shaped members under the head or neck of said animal.

11. The apparatus of claim 1 further comprising a transmitter effective for relaying a detectable signal to a receiver at a remote location, which said signal is effective for determining the position or direction of movement or both, of said animal, which said transmitter is incorporated into or onto said member or attached thereto.

12. The apparatus of claim 1 further comprising a telemetry system for receiving or transmitting data indicative of the position or direction of movement or both, of said animal, which said telemetry system unit is incorporated into or onto said member or attached thereto.

13. The apparatus of claim 1 further comprising a satellite positioning system receiver effective for determining the position of said animal, which said receiver is incorporated into or onto said member or attached thereto.

14. The apparatus of claim 1 further comprising:
a. a pair of said first loop-shaped members, said members adapted to fit over opposite ears or horns of said animal and be worn on the head of said animal,
b. means for acquiring data indicative of the position of said animal selected from the group consisting of a telemetry system for receiving or transmitting data indicative of the position said animal, and a satellite positioning system receiver effective for determining the position of said animal, and
c. a microprocessor in communication with said bilateral stimulus unit and said means for acquiring data indicative of the position of said animal, said microprocessor being effective for receiving data indicative of the position of said animal from said means, and selectively controlling the activation of said first or second stimuli generators, wherein said aversive stimulus unit comprises a bilateral stimulus unit comprising first and second independently operable aversive stimuli generators effective for selectively administering at least one aversive sensory stimulus onto one side of an animal, and further wherein said aversive stimulus unit, said means for acquiring data, and said microprocessor are incorporated into or onto one of said members or attached thereto.

15. The apparatus of claim 14 wherein said microprocessor is effective for determining movement and direction of said animal, comparing the position of said animal with the position of at least one predetermined boundary line to determine the closest boundary line and the distance of said animal therefrom, determining which side of said animal is nearest to said closest boundary line, and selectively activating one of said first or second stimuli generators in response to the determination of the distance from said closest boundary line and the determination of which side of the animal is nearest to said closest boundary line.

16. The apparatus of claim 1 wherein said first inner surface is adapted to generally conform to the shape of said animal's skull when placed over said ear or horn and in contact with said animal's head.

17. The apparatus of claim 1 further comprising an adhesive on said first surface for adhering said first surface directly to the head of said animal.

18. The apparatus of claim 1 further comprising a second loop-shaped member comprising a first and second opposed outer surfaces and an opening extending therethrough from said first surface to said second surface, said first surface of said second loop-shaped member adjacent to the head of said animal and adapted to be affixed thereto, and said second surface of said second loop-shaped member being adjacent to and removably attached to said first inner surface of said first 3-dimensional loop-shaped member with said opening of said second loop-shaped member being substantially aligned with said opening of said first loop-shaped member.

19. The apparatus of claim 18 wherein said second loop-shaped member is attached to said first inner surface of said first 3-dimensional loop-shaped member with cooperating, opposed hook and eye closures.

20. The apparatus of claim 1 wherein said first 3-dimensional loop-shaped member further comprises a chemical agent applicator effective for applying a chemical agent onto said head or ear or both of said animal.

21. The apparatus of claim 1 further comprising indicia on a surface of said loop-shaped member which is visible when said loop-shaped member is positioned on the head of said animal.

22. The apparatus of claim 1 further comprising an electronic identification device selected from the group consisting of a transmitter relaying animal identification information and a programmable computer chip containing animal identification information, which said electronic identification device is incorporated into or onto said member or attached thereto.

23. The apparatus of claim 1 further comprising a electrical power source selected from the group consisting of a battery, capacitor, and combinations thereof, which said power source is incorporated into or onto said member or attached thereto.

24. In a method for controlling the position of an animal comprising applying an aversive stimulus to an animal through one or more aversive stimulus units, wherein the improvement comprises at least one of said aversive stimulus units being supported by an apparatus to be worn on the head or head and neck of an animal which comprises a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further wherein said apparatus is placed on the head of said animal with said ear or horn protruding through said opening.

25. The process of claim 24 wherein animal is not human.

26. The process of claim 25 wherein animal is selected from the group consisting of bovine, caprine, equine, ovine, and porcine.

27. In a method of monitoring an animal comprising placing a transmitter on an animal effective for relaying a detectable signal to a remote location, wherein the improvement comprises said transmitter or receiver or both being supported by an apparatus to be worn on the head or head and neck of an animal which comprises a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further wherein said apparatus is placed on the head of said animal with said ear or horn protruding through said opening.

28. The process of claim 27 wherein animal is not human.

29. The process of claim 28 wherein animal is selected from the group consisting of bovine, caprine, equine, ovine, and porcine.

30. In a method for treating an animal comprising applying a chemical agent to an animal wherein the improvement comprises said chemical agent being carried by an apparatus to be worn on the head or head and neck of an animal which comprises a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further wherein said apparatus is placed on the head of said animal with said ear or horn protruding through said opening such that said chemical agent is in contact with said animal.

31. The process of claim 30 wherein animal is not human.

32. The process of claim 30 wherein animal is selected from the group consisting of bovine, caprine, equine, ovine, and porcine.

33. The process of claim 30 wherein said chemical agent is a pesticide.

34. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising a transmitter effective for relaying a detectable signal to a receiver at a remote location, which said signal is effective for determining the position or direction of movement or both, of said animal, which said transmitter is incorporated into or onto said member or attached thereto.

35. The apparatus of claim 34 wherein said signal is a radio frequency signal.

36. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising a telemetry system for receiving or transmitting data indicative of the position or direction of movement or both, of said animal, which said telemetry system unit is incorporated into or onto said member or attached thereto.

37. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising a satellite positioning system receiver effective for determining the position of said animal, which said receiver is incorporated into or onto said member or attached thereto.

38. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising an adhesive on said first surface for adhering said first surface directly to the head of said animal.

39. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and wherein said first 3-dimensional loop-shaped member further comprises a chemical agent applicator effective for applying a chemical agent onto said head or ear or both of said animal.

40. The apparatus of claim 39 wherein said chemical agent applicator comprises a chemical agent impregnated member attached to a surface of said first loop-shaped member.

41. The apparatus of claim 39 wherein said chemical agent applicator comprises a reservoir for said chemical agent in communication with said first loop-shaped member effective for distributing pesticide onto a surface of said first loop-shaped member.

42. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising an electronic identification device selected from the group consisting of a transmitter relaying animal identification information and a programmable computer chip containing animal identification information, which said electronic identification device is incorporated into or onto said member or attached thereto.

43. An apparatus to be worn on the head or head and neck of an animal comprising a first 3-dimensional loop-shaped member comprising a first inner surface, a second, opposed outer surface, a third outer surface extending between said first and second surfaces, and an opening extending through said member from said first surface to said second surface, wherein said member is of a size sufficient to fit over one ear or horn of an animal with said ear or horn protruding through said opening, said first inner surface facing toward said head of said animal, and said second outer surface facing away from the head of said animal, and further comprising a electrical power source selected from the group consisting of a battery, capacitor, and combinations thereof, which said power source is incorporated into or onto said member or attached thereto.

44. The apparatus of claim 43 further comprising a kinetic energy to power converter in communication with and effective for charging said power source.

45. The apparatus of claim 43 further comprising a solar panel in communication with and effective for charging said power source.

* * * * *